Patented Mar. 29, 1932                                             1,851,198

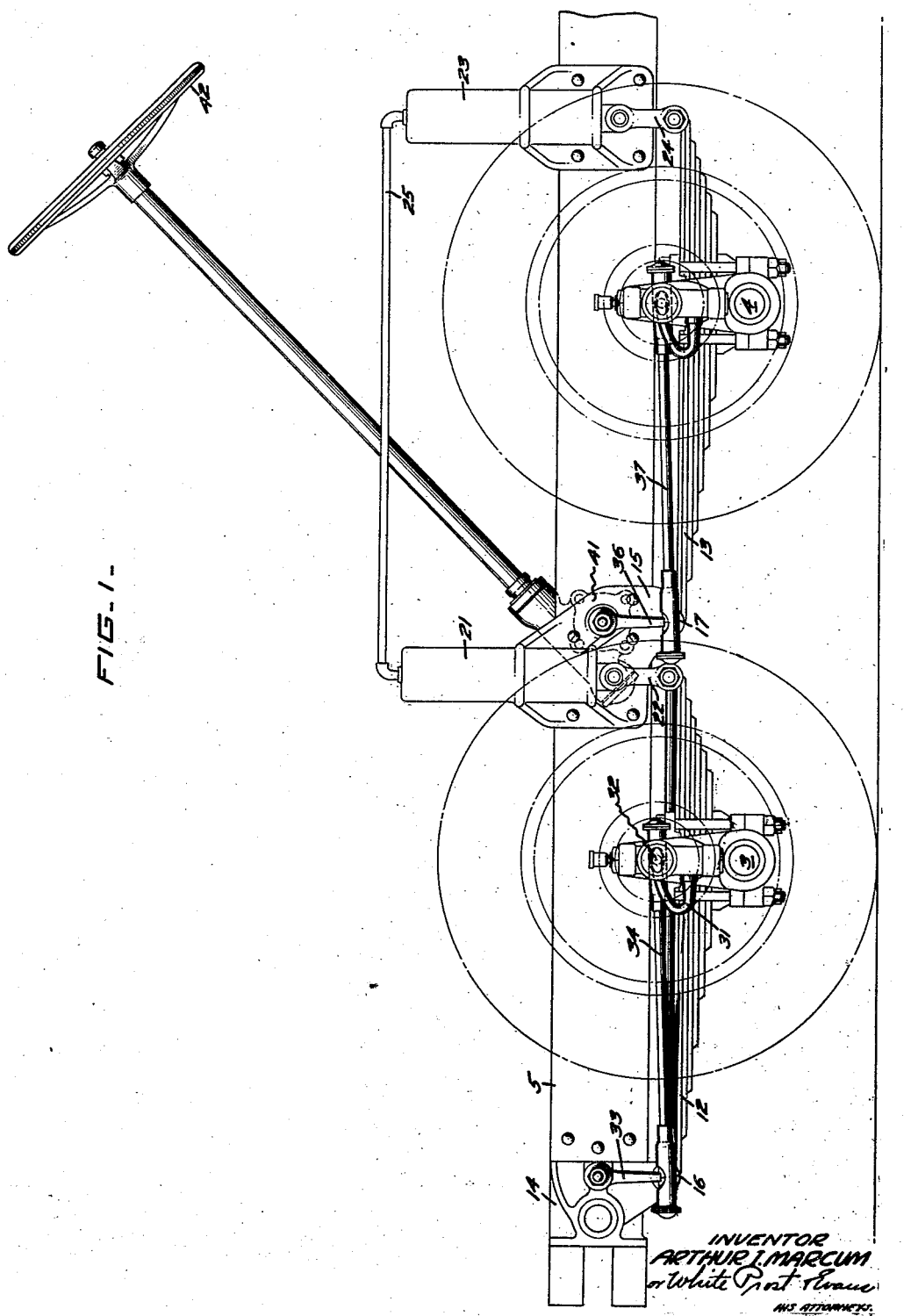

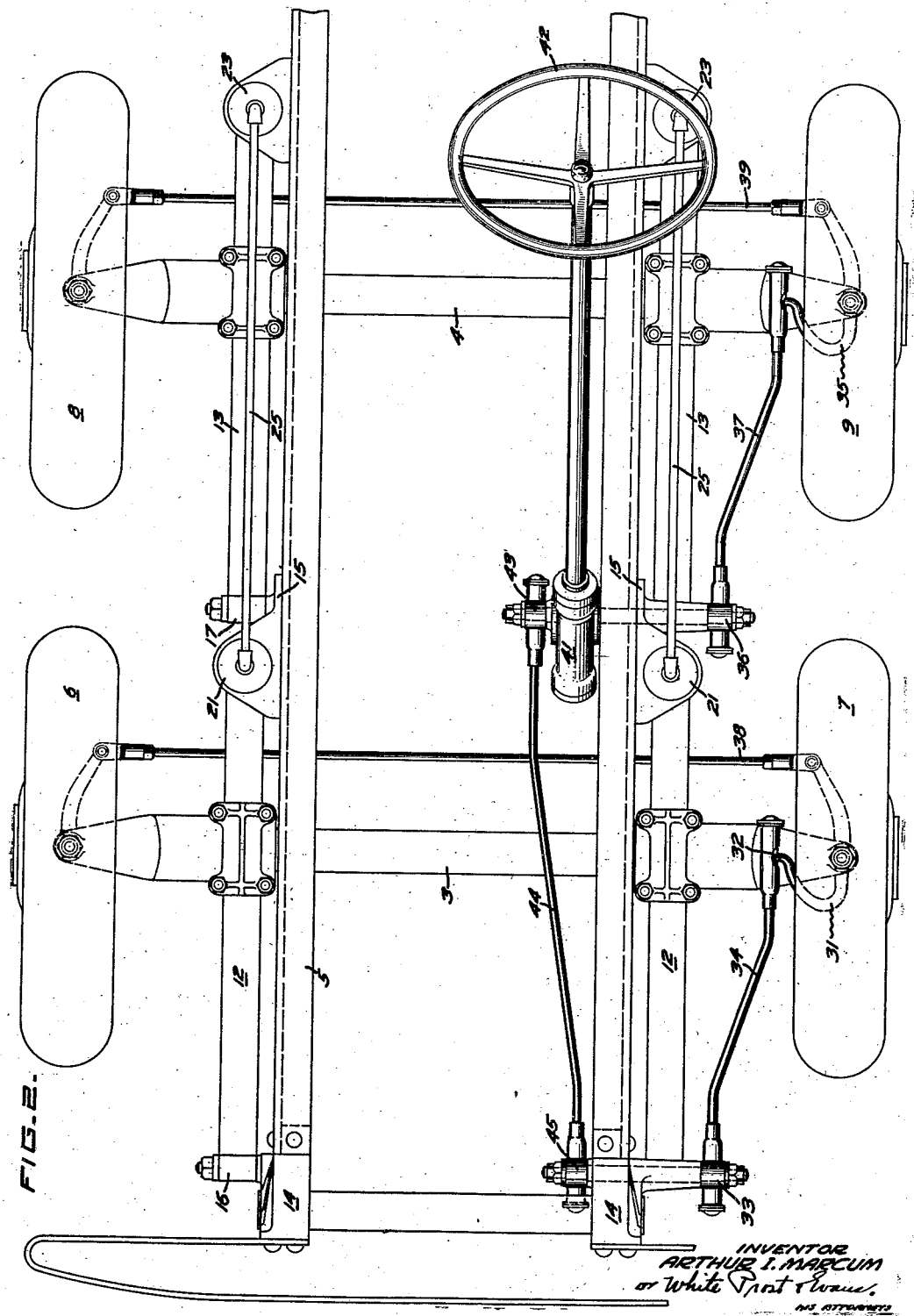

UNITED STATES PATENT OFFICE

ARTHUR I. MARCUM, OF OAKLAND, CALIFORNIA, ASSIGNOR, BY MESNE ASSIGNMENTS, TO AUTOMOTIVE ENGINEERING CORPORATION, A CORPORATION OF DELAWARE

DIRIGIBLE WHEEL MOUNTING AND STEERING APPARATUS

Application filed June 12, 1924. Serial No. 719,490.

The invention relates to a dirigible wheel mounting and steering apparatus for use on motor vehicles and particularly on road vehicles.

An object of the invention is to provide a dirigible wheel mounting and steering apparatus which will operate to prevent wobbling of the wheels as the vehicle travels over a rough or uneven road.

Another object of the invention is to provide a dirigible wheel mounting which will produce very easy riding qualities in the vehicle and which will prevent wobbling of the wheels.

A further object of the invention is to provide a spring suspension and steering apparatus for four dirigible wheels on tandem axles.

The invention possesses other advantageous features, some of which with the foregoing, will be set forth at length in the following description where I shall outline in full that form of my invention which I have selected for illustration in the drawings accompanying and forming part of the present specification. In said drawings I have shown one form of spring suspension and steering apparatus embodying my invention, but it is to be understood that I do not limit myself to such form, since the invention, as set forth in the claims, may be embodied in a plurality of forms.

Referring to said drawings:

Figure 1 is a side elevation, partly in section, of the front end of a road vehicle equipped with the spring suspension and steering apparatus of my invention.

Figure 2 is a top or plan view of the front end of a road vehicle embodying my invention.

The invention relates to the spring suspension and steering apparatus of the front wheels of a road vehicle and in the drawings I have shown it applied to a road vehicle having tandem front axles, each axle being provided with a pair of dirigible wheels. All four of the wheels are connected to the steering gear, so that the four wheels are simultaneously turned for the purpose of altering the course of the vehicle. The vehicle shown in the drawings is provided with two front axles 3 and 4 which are arranged below the vehicle frame 5 and which are provided on their ends respectively with the dirigible wheels 6—7 and 8—9. Interposed between the front axle 3 and the vehicle frame are a pair of leaf springs 12 and a similar pair of leaf springs 13 are interposed between the axle 4, and the vehicle frame. The springs 12 are pivoted at their forward ends to brackets 14 rigidly secured to the vehicle frame and the springs 13 are pivoted at their forward ends to brackets 15 rigidly secured to the vehicle frame. The front ends of the springs 12 and 13 are therefore immovable with respect to the vehicle frame, these springs being mounted at their forward ends on pivots 16—17 mounted in the brackets 14 and 15, respectively. The axles 3 and 4 are secured to the springs 12 and 13 intermediate the ends of the springs and preferably at a longer distance from the front end than from the rear end of the springs. At their rear ends, the springs 12 and 13 are connected to the vehicle frame in such a manner that they have a substantially vertical movement with respect to the vehicle frame. This is accomplished by providing air springs to which the rear ends of the springs 12 and 13 are connected. Secured to the vehicle frame and arranged over the rear ends of the springs 12, are closed top cylinders 21 in which are disposed pistons which are connected to the rear ends of the springs 12 by links 22. Disposed over the rear ends of the springs 13 and secured to the vehicle frame, are closed top cylinders 23 in which are disposed pistons which are connected to the rear ends of the springs 13 by the links 24. Air under pressure is contained within the cylinders 21 and 23 above the pistons therein and the compression of this air varies as the vehicle travels over a road, thus permitting the rear ends of the springs to move in substantially vertical planes. The cylinders 21 and 23 are preferably connected together by a conduit 25 whereby a shock transmitted to either axle 3 or 4 is transmitted through the air under pressure to the spring of the other axle, thus distributing the shock through the entire spring suspension.

Means are provided for steering the four dirigible wheels 6, 7, 8 and 9 and the steering means is so arranged that vertical movement of the axles, due to relative movement of the axles and the frame as the vehicle passes over a rough road, will not cause wobbling of the dirigible wheels. Since the front ends of the springs 12 and 13 are fixed, the axles 3 and 4 move in a path which is substantially an arc about the center of the pivots 16 and 17, and the steering apparatus is so arranged that this movement of the axles will not cause a dirigible movement of the wheels. This movement of the axles, in steering mechanisms as heretofore constructed, caused a variation in the distance between the axis of the dirigible wheel and the front support of the drag link for steering the wheel, thereby causing a movement of the wheel. In accordance with my invention, the front end of the drag link is normally concentric with the front end of the leaf spring, so that the center of the wheel and the point of connection between the drag link and the steering arm of the wheel move in concentric circles, so that there is no foreshortening or lengthening of the distance and consequently no wobbling of the wheel. One wheel 7 of the front pair of wheels 6—7, is provided with a steering arm 31, the free end 32 of which is normally concentric with the axis of the wheel 7 and, when the vehicle is travelling a straight course, is coincident with the axis of the wheels 6 and 7. Mounted in the vehicle frame in front of the axle 3 is a steering arm 33, the free end of which is concentric with the pivot 16, when the vehicle is travelling a straight course. The free end of the arm 33 is connected with the free end of the arm 31 by a drag link 34 and since the effective length of this drag link is equal to the distance between the center of the pivot 16 and the center of the wheel 7, movement of the wheel with respect to the frame will not produce movement of the free end 32 of the steering arm 31. One of the wheels 9 of the rear axle 4 is provided with a steering arm 35, the free end of which is concentric with the axis of the wheel 9. The steering arm 36 for the wheel 9 is mounted in the vehicle frame and the free end of the arm 36 is concentric with the axis of the pivot 17, when the vehicle is travelling a straight course. The free end of the arm 36 is connected to the free end of the arm 35 by a drag link 37 which is constructed and arranged in the same manner as the drag link 34.

The wheels 6 and 7 are connected together by the tie rod 38 and the wheels 8 and 9 are connected together by the tie rod 39. The vehicle is provided with a steering gear 41 which is operated by the steering wheel 42 and the steering gear is directly connected to the steering arm 36 and to the steering arm 43, which is preferably parallel to the steering arm 36. The steering arm 43 is connected by the drag link 44 with the steering arm 45, which is preferably parallel to the steering arm 33 and is secured to the same shaft as the steering arm 33, so that movement of the steering arm 43 is transmitted to the steering arm 33. Since the steering arms 36 and 43 are secured to the same shaft and since the steering arm 43 is connected with the steering arm 33, the steering arms 33 and 36 are simultaneously moved to steer the vehicle. As the vehicle travels over a rough road, the center of the wheel 7 moves in an arc about the pivot 16 and the free end 32 of the steering arm 31 also moves in an arc about the pivot 16, and since the free end 32 of the steering arm and the axis of the wheel 7 are in alinement, the vertical movement of the wheel will not cause lateral movement of the free end 32 of the steering arm and consequently will not cause and will not permit wobbling of the dirigible wheels. The rear ends of the springs 12 and 13 have a relatively large movement, and the springs 12 and 13 are preferably flat, so that the centers of the wheels move substantially in arc about the centers of the pivots 16 and 17. Vertical movement of the axles with respect to the vehicle frame, therefore does not interfere with the steering of the wheels, thereby rendering steering control of the vehicle very easy.

I claim:

1. A vehicle comprising a pair of axles; a pair of steering wheels supporting each axle; a frame; means for supporting said frame from said axles in a manner to divide the frame load equally between said axles; and permitting a substantial motion of each of said axles about independent fixed axes with relation to said frame; steering means for said wheels supported from said wheels; steering control means supported on said frame comprising connections substantially to said fixed axes; and connections substantially from each fixed axis to the axle supported steering members.

2. A multi-wheel road vehicle including a frame, parallel axles, dirigible wheels on said axles, springs interconnecting said frame and said axles, each spring being secured to an axle and pivoted to said frame at one end so that each axle is free to swing relative to the frame about the spring pivots, equalizing means between said springs, steering mechanism on said frame, and means connecting said frame carried steering mechanism to said dirigible wheels including arms mounted to swing on axes that are substantially in vertical alignment with the axes of the spring pivots.

In testimony whereof, I have hereunto set my hand.

ARTHUR I. MARCUM.